(12) United States Patent
Buck et al.

(10) Patent No.: US 12,187,133 B2
(45) Date of Patent: Jan. 7, 2025

(54) CARAVAN WITH TRACTION/THRUST LIMITATION

(71) Applicant: Erwin Hymer Group SE, Bad Waldsee (DE)

(72) Inventors: Rainer Buck, Wangen i. Allgau (DE); Marcus Metzler, Bad Waldsee (DE); Günter Dorn, Schlier (DE); Rüdiger Freimann, Eberhardzell (DE)

(73) Assignee: Erwin Hymer Group SE, Bad Waldsee (DE)

( * ) Notice: Subject to any disclaimer, the term of this patent is extended or adjusted under 35 U.S.C. 154(b) by 708 days.

(21) Appl. No.: 17/270,099

(22) PCT Filed: Aug. 26, 2019

(86) PCT No.: PCT/EP2019/072734
§ 371 (c)(1),
(2) Date: May 27, 2021

(87) PCT Pub. No.: WO2020/039103
PCT Pub. Date: Feb. 27, 2020

(65) Prior Publication Data
US 2021/0291667 A1 Sep. 23, 2021

(30) Foreign Application Priority Data
Aug. 24, 2018 (DE) .................... 10 2018 120 790.5

(51) Int. Cl.
*B60L 15/20* (2006.01)
*B60K 1/02* (2006.01)
(Continued)

(52) U.S. Cl.
CPC ............ *B60L 15/2009* (2013.01); *B60K 1/02* (2013.01); *B60T 7/20* (2013.01); *B60T 8/248* (2013.01);
(Continued)

(58) Field of Classification Search
CPC ...... B60W 30/12; B60L 15/2009; B60T 7/20; B60T 8/248
See application file for complete search history.

(56) References Cited

U.S. PATENT DOCUMENTS 5,747,683 A * 5/1998 Gerum .................. B60T 8/1708
701/72
6,223,114 B1 * 4/2001 Boros .................. B60T 8/17552
701/72

(Continued)

FOREIGN PATENT DOCUMENTS

DE 102016204090 A1 * 9/2017
DE 102010033558 A 2/2019

(Continued)

OTHER PUBLICATIONS

European Communication 94(3) Examination Report, dated Jan. 10, 2023, pp. 1-4, pertaining to corresponding European Application No. 19762113.9.

*Primary Examiner* — Jaime Figueroa
*Assistant Examiner* — Jerrod Irvin Davis
(74) *Attorney, Agent, or Firm* — Dinsmore & Shohl LLP

(57) ABSTRACT

A trailer includes a battery and an axle or a tandem axle with wheels driven by way of electric motors. The battery supplies electricity to the electric motors during trailer travel, and a sensor detects forces on a coupling of the trailer in at least one of the following directions: longitudinal direction of the trailer and/or transverse direction of the trailer and/or perpendicular direction, and a controller controls the electric motors, so that a minimum and/or a maximum limit value is adhered to.

18 Claims, 1 Drawing Sheet

(51) Int. Cl.
  *B60T 7/20* (2006.01)
  *B60T 8/24* (2006.01)
  *B62D 11/04* (2006.01)
  *B62D 13/00* (2006.01)
  *B62D 59/04* (2006.01)

(52) U.S. Cl.
  CPC .............. *B62D 11/04* (2013.01); *B62D 13/00* (2013.01); *B62D 59/04* (2013.01); *B60L 2200/28* (2013.01); *B60L 2240/18* (2013.01); *B60L 2240/461* (2013.01)

(56) References Cited

U.S. PATENT DOCUMENTS

| | | |
|---|---|---|
| 2007/0193795 A1 | 8/2007 | Forsyth |
| 2011/0042154 A1* | 2/2011 | Bartel ................. B60W 10/184 |
| | | 180/11 |
| 2015/0051795 A1 | 2/2015 | Keys, II et al. |
| 2020/0233410 A1* | 7/2020 | Burns ..................... B60L 50/66 |

FOREIGN PATENT DOCUMENTS

| | | | |
|---|---|---|---|
| EP | 2913240 A2 * | 9/2015 | ............ B60W 10/20 |
| NL | 2015873 B1 * | 6/2017 | |

* cited by examiner

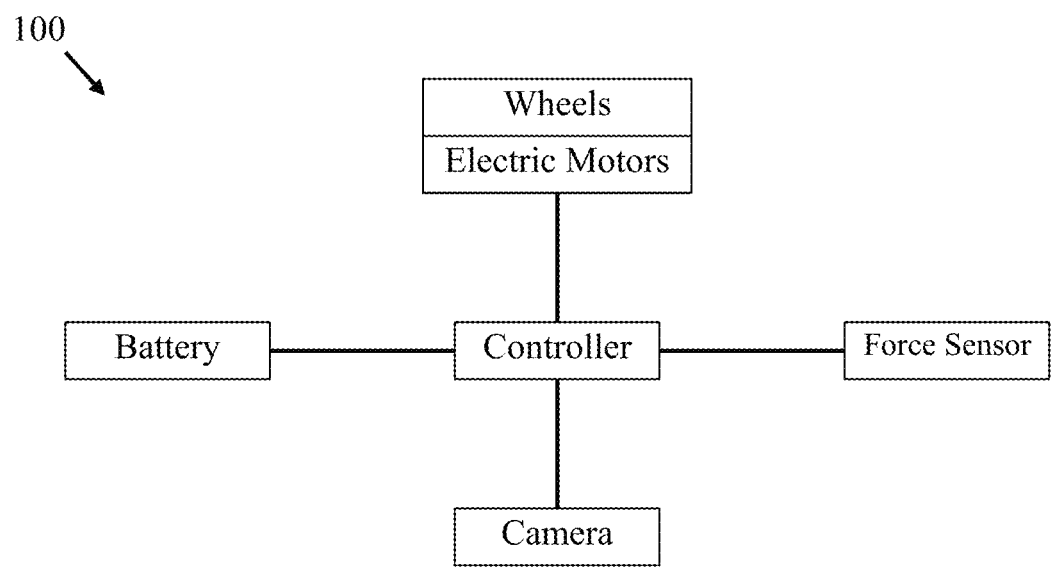

CARAVAN WITH TRACTION/THRUST LIMITATION

CROSS-REFERENCE TO RELATED APPLICATIONS

This application is the United States national phase of International Application No. PCT/EP2019/072734 filed Aug. 26, 2019, and claims priority to German Patent Application No. 10 2018 120 790.5 filed Aug. 24, 2018, the disclosures of which are hereby incorporated by reference in their entirety.

BACKGROUND OF THE INVENTION

Field of the Invention

The invention relates to a method for restriction of towing force/thrust force in the case of a trailer, in particular a travel trailer.

Description of Related Art

A camper or travel trailer is a trailer for a motor vehicle, in which suitable equipment for persons to live and stay in it is installed. Such a travel trailer is conventionally pulled as a trailer in road traffic, without any drive of its own, purely by means of the towing vehicle. Generally, this is a single-axle trailer or a trailer having a tandem axle.

Even independent of the type of drive, motor vehicles have a lesser and lesser trailer load or towing force in comparison with the past. Towing a trailer can greatly increase wear on the engine, clutch, transmission, brakes and tires, and can lead to overheating of the radiator and brakes. Greatly increased energy consumption or fuel consumption occurs, along with deterioration of the driving dynamics and driving stability. A motor vehicle as a towing vehicle must therefore be selected to have a correspondingly great vehicle weight, powerful engines and, if necessary, all-wheel drive, and this results in additional costs and increased fuel consumption or energy consumption during normal operation.

Furthermore, hybrid vehicles and entirely electric vehicles are increasingly being used as motor vehicles. If such vehicles tow a trailer, a noticeable or even enormous reduction in range occurs in the case of entirely electric vehicles, and in the case of hybrid vehicles, it can lead to the result that the required additional electric power of the electric drive is not available for a sufficiently long period of time, since the battery is exhausted. Due to current battery technology, the range is still clearly restricted.

This holds true, in particular, for towing a travel trailer, since such a trailer causes great air resistance due to its high construction, and therefore causes a markedly increased fuel consumption or energy consumption of the towing vehicle while towing. During operation with a trailer, the consumption also increases in accordance with the moving total load, and leads to a clear reduction in range. In addition, the maximum drive power of electric vehicles is also mostly designed for predominant use in city traffic.

The problem of range reduction can easily be solved by means of a trailer that is essentially driven on its own. Using the same approach, a conventionally driven (small) vehicle that is being operated at its maximum trailer load and does not have any reserves can also be relieved of stress. Such trailers are equipped with a battery or an energy supply unit for producing electricity, so as to supply the towing vehicle with energy or so as to contribute to the forward movement by way of driven wheels of the trailer. In the case of electric vehicles, such trailers are also referred to as Range Extenders that increase the range.

The permissible trailer load of a towing vehicle is essentially determined by four factors. The first is the maximum towing power of the towing vehicle, which is a function of the engine power and of the wheel drive power that can be transferred to the ground by the vehicle weight.

The second determining factor is the maximum braking force of the towing vehicle as a function of the brake design and also the traction at the wheels that can be transferred by means of the wheel load or the vehicle weight.

The third determining factor of the trailer load is the maximum transverse force, which can lead to "jack-knifing" of the car and trailer combination, in particular in the event of braking during a curve. In this event, the transverse force is a function of the transferable total traction at the rear wheels. The traction force of a wheel, which is a function of the wheel load, is composed vectorially of the effective transverse force and the acceleration force in effect at a point in time, whether this is a braking force or a driving force.

The fourth factor is the structural strength of the trailer coupling.

The stress on the trailer coupling results from the static and dynamic force applications of the trailer in all three spatial axes, in other words the towing/thrust forces during acceleration or braking, respectively, the support force in effect in the perpendicular direction, which can change dynamically due to acceleration and braking, as well as the transverse forces, for example when driving along a curve or those caused by stress due to side winds.

Since electric vehicles or hybrid vehicles, in particular, permit only low trailer loads, travel trailers, which make use of the permissible trailer loads of conventional motor vehicles having an internal combustion engine, cannot be used, if only because of their size and the possibility of loading them up. Therefore, if it were possible to permanently and reliably reduce the forces on the trailer coupling, small towing vehicles would be able to manage great trailer loads.

SUMMARY OF THE INVENTION

The present invention is based on the task of making available a trailer, in particular a travel trailer, which can be moved also by towing vehicles having a trailer load below the permissible total weight of the trailer, as a towing vehicle in road traffic.

DESCRIPTION OF THE INVENTION

FIG. 1 depicts a trailer 100 in accordance with embodiments described further herein. It is advantageous if the forces are detected in the longitudinal direction, in particular, and if the pulling/thrust forces for a lower trailer load than one that corresponds to the total weight of the trailer are adhered to by means of driving or braking the electric motors. A minimum and/or maximum limit value of the force, particularly in the longitudinal direction of the vehicle, is adhered to.

The range of electric vehicles during trailer operation can be significantly increased, in particular, by means of the great amount of energy stored in the trailer.

It is advantageous that a lower trailer load is simulated by means of the controller, by means of an additional acceleration of the wheels of the trailer or by means of braking.

In this way, even very light vehicles having a low drive power and a weakly designed chassis can pull large and heavy trailers. For example, it is conceivable that even vintage cars having only a low trailer load capacity can tow a travel trailer.

The stress on and wear of the towing motor vehicle is clearly reduced in that support can take place during load peaks, during initial movement, and during uphill driving. In particular, in the case of a towing vehicle having an internal combustion engine, adherence to upcoming exhaust gas standards can be achieved more easily, since trailer operation has only a slight effect on the engine stress and speed of rotation, as well as on fuel consumption, in that only a low effective trailer load is ensured. For example, it is possible to achieve a range during trailer operation of approximately 500 km in this way, even with an electric vehicle as the towing vehicle.

By means of the brake with its own energy supply in the trailer, which is independent of the towing vehicle, in particular the regenerative brake, not only the towing relief in the drive case but also the thrust relief can be permanently regulated and thereby ensured. In addition to regenerative braking, the service brake can be electrically activated in a supportive manner.

In an advantageous embodiment, the controller increases the support load by means of braking the electric motors, and thereby increases the possible transverse force of the rear wheels of the towing vehicle.

In particular or supplementally, the trailer can be braked "automatically" when driving along a curve, so as to increase the traction of the rear axle of the towing vehicle by means of an increased support load.

In a further development of the invention, the controller can control the electric motors of the two sides of the trailer separately and thereby exert a steering moment on the trailer.

The controller can also control a service brake of the wheels, optionally controlling the service brake of each side of the trailer individually.

Further sensor means can detect an articulation angle between the towing vehicle and the trailer, in particular by way of sensors or a camera and image processing software.

In a further advantageous embodiment of the invention, regulation software of the controller comprises an observer that comprises a system model of the trailer, in particular on the basis of speeds of rotation of the wheels, transverse acceleration, and the articulation angle between the towing vehicle and the trailer, and, on the basis of this observer, compares the actual values, in particular the yaw rates, and turns the electric motors on and/or turns the service brake on.

In this regard, the regulation need of the towing/thrust relief can take place by means of different sensors acting together or individually and/or in model-based manner. A model-supported electronic system observer on the trailer, similar to an ESP, can determine the driving dynamics reference values of side slip angles and yaw angles of the trailer in relation to the towing vehicle on the basis of forces acting on a force sensor at the trailer coupling, wheel speeds of rotation, transverse acceleration, and articulation angles to the towing vehicle, and compare them with real values, for example of a yaw rate sensor, and intervene to correct the driving dynamics by way of the electric motors or the service brake.

In an advantageous embodiment, the controller can exert a pushing force on the towing vehicle, by way of the driven wheels, in particular when starting to move.

In this way, the result can be achieved, for example when starting to move, that not only the driven axle of the towing vehicle but also the trailer axle acts as a driving axle for the towing vehicle, and that better overall traction is achieved, similar to the situation for a vehicle with four-wheel drive. Fundamentally, it is also possible to "push" a towing vehicle, without any transverse forces, and thereby to create a reserve function, in particular for electric vehicles, in which the trailer serves as the sole emergency drive, so to speak. In this regard, for safety reasons the thrust force must be coordinated with the traction potential of the towing vehicle, in terms of regulation technology, or restricted to a value that is generally non-critical. This "emergency function" can serve, for example, for the purpose of being able to leave a hazardous location, or reaching the next charging station. In this regard, slight regeneration in the pushed "towing vehicle" can maintain a minimum charging state in the vehicle and thereby supply energy to vehicle safety systems such as brakes, steering, and lights, for example.

Alternatively or in addition, a retarder function can be integrated for when the battery is fully charged, which function can supplement or replace the service brake.

The goal of regulation is a force effect that is directed, essentially free of transverse force, at the longitudinal axis of the vehicle.

Actuators are the electric motors individual to the wheels (Torque Vectoring), if necessary supplemented by the service brake. In this regard, suitable sensors are required, for one thing force sensors at the coupling point in all three spatial directions (e.g., the longitudinal direction of the trailer, transverse direction of the trailer, and perpendicular direction of the trailer) (on the trailer or the towing vehicle), as well as, for another thing, force sensors or force/path sensors (spring deflection) in the longitudinal direction of the trailer, combined with articulation angle detection (sensor, camera, etc.) between the towing vehicle and the trailer, and the wheel moments on the trailer (equivalent to the transverse force effect on the trailer coupling).

The invention claimed is:

1. A trailer comprising:
   a battery and an axle or a tandem axle with wheels driven by way of electric motors on each of the wheels, wherein the battery is designed for supplying electricity to the electric motors;
   a force sensor detecting forces on a coupling of the trailer in a longitudinal direction of the trailer, a transverse direction of the trailer, and a perpendicular direction of the trailer; and
   a controller for controlling the electric motors so that a minimum limit value or a maximum limit value in the longitudinal direction of the trailer, the transverse direction of the trailer, or the perpendicular direction of the trailer is adhered to, wherein regulation software of the controller comprises an observer comprising a system model of the trailer to correct driving dynamics by way of the electric motors on each of the wheels, wherein the system model of the trailer is based on reference values of speed of rotation of the wheels, transverse acceleration, and articulation angle between a towing vehicle and the trailer, and compares the reference values with actual values and controls the electric motors of the wheels based on the observer.

2. The trailer according to claim 1, wherein towing/thrust forces are adhered to for a lower trailer load than a load that corresponds to a permissible total weight of the trailer, by controlling the electric motors as needed.

3. The trailer according to claim 2, wherein the controller controls the service brake of the wheels on each side of the trailer separately.

4. The trailer according to claim 2, wherein the trailer further comprises an articulation angle detecting camera and image processing software detecting the articulation angle between the towing vehicle and the trailer.

5. The trailer according to claim 1, wherein the controller increases a support load by means of braking the electric motors, and thereby increases a longitudinal force on the coupling of the trailer.

6. The trailer according to claim 5, wherein the controller controls the electric motors of two sides of the trailer separately and thereby exerts a steering torque on the trailer in order to maintain the forces on the coupling of the trailer in the transverse direction within the minimum limit value or the maximum limit value.

7. The trailer according to claim 5, wherein the controller controls the service brake of the wheels.

8. The trailer according to claim 5, wherein the controller controls the service brake of each side of the trailer separately.

9. The trailer according to claim 1, wherein the controller controls the electric motors of two sides of the trailer separately and thereby exerts a steering torque on the trailer.

10. The trailer according to claim 1, wherein the sensor detects the articulation angle between the towing vehicle and the trailer.

11. The trailer according to claim 1, wherein the controller controls the electric motors to exert a pushing force on the towing vehicle.

12. The trailer according to claim 1, wherein the regulation software of the controller comprising the observer compares yaw rates of the actual values and controls the electric motors or the service brake of the wheels based on the observer.

13. The trailer according to claim 1, wherein the controller controls the electric motors to exert a pushing force on the towing vehicle, by way of the wheels when starting to move.

14. The trailer according to claim 1, wherein slip angles and yaw rates from the observer are calculated based on the speed of rotation of the wheels, transverse acceleration, and articulation angle between the towing vehicle and the trailer.

15. The trailer according to claim 14, further comprising a yaw rate sensor, wherein the controller compares a yaw rate of the yaw rate sensor with yaw rates from the observer.

16. The trailer according to claim 1, wherein the controller individually controls the electric motors on each of the wheels to adhere to the minimum limit value or the maximum limit value in the longitudinal direction of the trailer, the transverse direction of the trailer, or the perpendicular direction of the trailer.

17. A trailer comprising:
a battery and an axle or a tandem axle with wheels driven by way of an electric motor on each of the driven wheels, wherein the battery is designed for supplying electricity to the electric motors;
a force sensor detecting forces on a coupling of the trailer in a longitudinal direction of the trailer, a transverse direction of the trailer, and a perpendicular direction of the trailer; and
a controller for controlling the electric motors to exert a pushing force on the towing vehicle by way of the driven wheels so that a minimum limit value or a maximum limit value in the longitudinal direction of the trailer, the transverse direction of the trailer, or the perpendicular direction of the trailer is adhered to, wherein regulation software of the controller comprises an observer comprising a system model of the trailer to correct driving dynamics by way of the electric motors on each of the driven wheels, wherein the system model of the trailer is based on reference values of speed of rotation of the driven wheels, transverse acceleration of the trailer, and articulation angle between a towing vehicle and the trailer, and compares the reference values with actual values and controls the electric motors of the driven wheels to correct the driving dynamics of the trailer based on the observer.

18. A trailer according to claim 17, wherein the trailer further comprises an articulation angle detecting camera and image processing software detecting the articulation angle between the towing vehicle and the trailer.

* * * * *